US012428170B2

(12) United States Patent
Vernon et al.

(10) Patent No.: US 12,428,170 B2
(45) Date of Patent: Sep. 30, 2025

(54) METHODS AND APPARATUS FOR AUTOMATIC DRONE RESUPPLY OF A PRODUCT TO AN INDIVIDUAL BASED ON GPS LOCATION, WITHOUT HUMAN INTERVENTION

(71) Applicant: DRONEUP, LLC, Virginia Beach, VA (US)

(72) Inventors: John Vernon, Virginia Beach, VA (US); Oleksii Naboichenko, Chesapeake, VA (US)

(73) Assignee: DroneUp, LLC, Virginia Beach, VA (US)

( * ) Notice: Subject to any disclaimer, the term of this patent is extended or adjusted under 35 U.S.C. 154(b) by 0 days.

(21) Appl. No.: 17/473,507

(22) Filed: Sep. 13, 2021

(65) Prior Publication Data
US 2022/0144427 A1 May 12, 2022

Related U.S. Application Data

(60) Provisional application No. 63/078,046, filed on Sep. 14, 2020.

(51) Int. Cl.
B64C 39/02 (2023.01)
B64U 10/13 (2023.01)
(Continued)

(52) U.S. Cl.
CPC .......... *B64U 10/13* (2023.01); *B64U 2101/15* (2023.01); *B64U 2101/60* (2023.01); *B64U 2201/104* (2023.01)

(58) Field of Classification Search
CPC ....... B64C 39/024; B64C 19/00; B64C 29/00; G06Q 10/087; G06Q 10/083;
(Continued)

(56) References Cited

U.S. PATENT DOCUMENTS 9,307,383 B1* 4/2016 Patrick ................. B64C 39/024
10,972,891 B2* 4/2021 Will, IV ................ G08G 1/202
(Continued)

FOREIGN PATENT DOCUMENTS

CN 105874503 A 8/2016
JP 2018032219 A 3/2018

OTHER PUBLICATIONS

International Search Report and Written Opinion for International Application No. PCT/US2021/050109, mailed Jun. 14, 2022, 19 pages.

*Primary Examiner* — Angela Y Ortiz
*Assistant Examiner* — Aarron E Santos
(74) *Attorney, Agent, or Firm* — Cooley LLP

(57) ABSTRACT

A processor-implemented method includes receiving, at a processor, from a transceiver and without human intervention, location data associated with a target. The processor receives, from the transceiver, product data for a resupply request referencing the target, the product data including at least one of a product type or a product quantity. The processor generates, without human intervention, unmanned autonomous vehicle (UAV) mission data based on the location data and the product data, the UAV mission data including a representation of at least one UAV and flight path data for the at least one UAV. The UAV mission data is caused to transmit to at least one UAV controller to cause the at least one UAV controller to initiate navigation of the at least one UAV according to the UAV mission data.

19 Claims, 3 Drawing Sheets

(51) Int. Cl.
*B64U 101/00* (2023.01)
*B64U 101/15* (2023.01)
*B64U 101/60* (2023.01)

(58) Field of Classification Search
CPC ....... G06Q 30/0202; G06Q 10/063112; G06Q 10/0833; G06Q 50/30; B64U 2101/60; B64U 10/00; B64U 10/10; B64U 2101/00; B64U 2201/00; B64U 2201/104; B64U 2201/20; G08G 5/0069; G08G 1/202; G08G 5/0026; G16H 20/10; G16H 40/20; G16H 40/63; G16H 40/67; H04W 4/90; H04W 4/021; A61G 2203/22; G05D 1/0088; G05D 1/102; G05D 1/104; G08B 21/18; G09B 23/28; G09B 23/285
See application file for complete search history.

(56) References Cited

U.S. PATENT DOCUMENTS

| | | | |
|---|---|---|---|
| 11,265,313 B2* | 3/2022 | Ito | B64C 39/024 |
| 2015/0120094 A1* | 4/2015 | Kimchi | G08G 5/55 |
| | | | 701/3 |
| 2015/0353195 A1* | 12/2015 | Peeters | G08G 5/57 |
| | | | 701/3 |
| 2017/0132393 A1* | 5/2017 | Natarajan | G06Q 10/087 |
| 2017/0286887 A1* | 10/2017 | Moran | G06Q 10/063112 |
| 2018/0158020 A1* | 6/2018 | Khasis | G01C 21/343 |
| 2019/0392380 A1* | 12/2019 | O'Brien | G06Q 10/087 |
| 2020/0355456 A1* | 11/2020 | Deng | H04N 23/66 |
| 2020/0377301 A1 | 12/2020 | Chila et al. | |

* cited by examiner

METHODS AND APPARATUS FOR AUTOMATIC DRONE RESUPPLY OF A PRODUCT TO AN INDIVIDUAL BASED ON GPS LOCATION, WITHOUT HUMAN INTERVENTION

CROSS-REFERENCE TO RELATED APPLICATIONS

This application claims priority to and the benefit of U.S. Provisional Patent Application No. 63/078,046, filed Sep. 14, 2020 and titled "Methods and Apparatus for Automatic Drone Resupply of a Product to an Individual Based on GPS Location, Without Human Intervention," the content of which is incorporated by reference herein in its entirety for all purposes.

FIELD

The disclosure herein describes methods and apparatus for resupply of a product by navigating an unmanned autonomous vehicle to a location using little to no human intervention.

BACKGROUND

Autonomous aerial vehicles, also referred to as aerial drones or drones, are used in a variety of ways including aerial photography, infrastructure inspection, and product delivery. Such known aerial drone uses, however, often require a high level of human involvement, which may not always be practical or desired. Thus, a need exists for improved techniques for aerial drones.

SUMMARY

In some embodiments, a method includes receiving, at a processor, from a transceiver and without human intervention, location data associated with a target. The processor receives, from the transceiver, product data for a resupply request referencing the target, the product data including at least one of a product type or a product quantity. The processor generates, without human intervention, unmanned autonomous vehicle (UAV) mission data based on the location data and the product data, the UAV mission data including a representation of at least one UAV and flight path data for the at least one UAV. The UAV mission data is caused to transmit to at least one UAV controller to cause the at least one UAV controller to initiate navigation of the at least one UAV according to the UAV mission data.

In some embodiments, a method includes receiving, at a processor, from a global positioning system (GPS) transceiver and without human intervention, location data associated with a target. The processor receives, from one of an inventory sensor or an inventory actuator, product data for a resupply request referencing the target, the product data including at least one of a product type or a product quantity. In response to receiving the location data and the product data, a signal is transmitted, via the processor, to a remote compute device, the signal including a representation of the location data and a representation of the product data, to cause the remote compute device to direct an unmanned autonomous vehicle (UAV) to navigate to within a predefined range of the target.

In some embodiments, a non-transitory computer readable storage medium stores data representing software executable by a computer, the software including instructions to receive, without human intervention, location data associated with a target. Product data is received for a resupply request referencing the target, the product data including at least one of a product type or a product quantity. A first portion of UAV mission data is generated based at least in part on the location data and the product data, the first portion of UAV mission data including a representation of at least one UAV to be used for the resupply request. A second portion of UAV mission data is generated based on at least two of the location data, the product data, or a location of the at least one UAV. The second portion of UAV mission data including a representation of a flight path data for the at least one UAV. The first portion of UAV mission data and the second portion of UAV mission data are caused to be transmitted to at least one UAV controller to cause the at least one UAV controller to navigate the at least one UAV according to the second portion of UAV mission data.

DETAILED DESCRIPTION

In one or more embodiments, an individual can be equipped with a transceiver, GPS transceiver, and at least one of an inventory sensor and an inventory actuator. The transceiver can receive location information from the GPS transceiver and resupply information (e.g., product type and/or product quantity) from the inventory sensor and/or inventory actuator. The location information and some or all of the resupply information can be generated without human intervention by the individual. The transceiver can send, to a compute device, a signal indicating or representing the location information, product type and/or product quantity. The compute device can use this information to generate flight path information and mission information (e.g., product type, product quantity and drone selection), which is forwarded from the compute device to a drone controller. The drone controller can cause a drone loaded with resupply product to deliver the resupply product to the individual and drop the resupply product to the individual from an airborne location.

Such one or more embodiments advantageously allows the individual to be resupplied without knowing his or her location and without knowing the product type and/or product quantity. This can avoid potential errors by the individual in identifying the location, product type and/or product quantity. This can also allow the individual to engage in other activities while a resupply product(s) are ordered. This can be particularly advantageous when the individual is involved in an activity that requires or involves a lack of distractions such as medical care, military activities, etc.

It can be appreciated that "resupplying" can include supplying. In other words, a product does not previously have to have been delivered to a location for a drone to make a delivery. As an example, in the event of a natural disaster (e.g., earthquake, flooding, wildfire), a drone may receive a signal, either without human intervention (e.g., autonomously from a seismometers, radar map, rain gauge, satellite, etc.) or with human intervention (e.g., individual pressing an emergency button), that causes the drone to deliver a product to a location for the first time (i.e., not as a resupply).

It can be appreciated that "product" can include a service (e.g., taking a photograph/video, providing light, providing water, sanitizing, providing a network connection, etc.). As an example, in the event that a hospital loses a Wi-Fi connection, a drone may receive a signal, either without human intervention (e.g., hospital modem/router sends an alert when the Wi-Fi is lost) or with human intervention (e.g., hospital staff pressing a button), that causes the drone to navigate to the hospital and provide a Wi-Fi connection.

Figure 1:
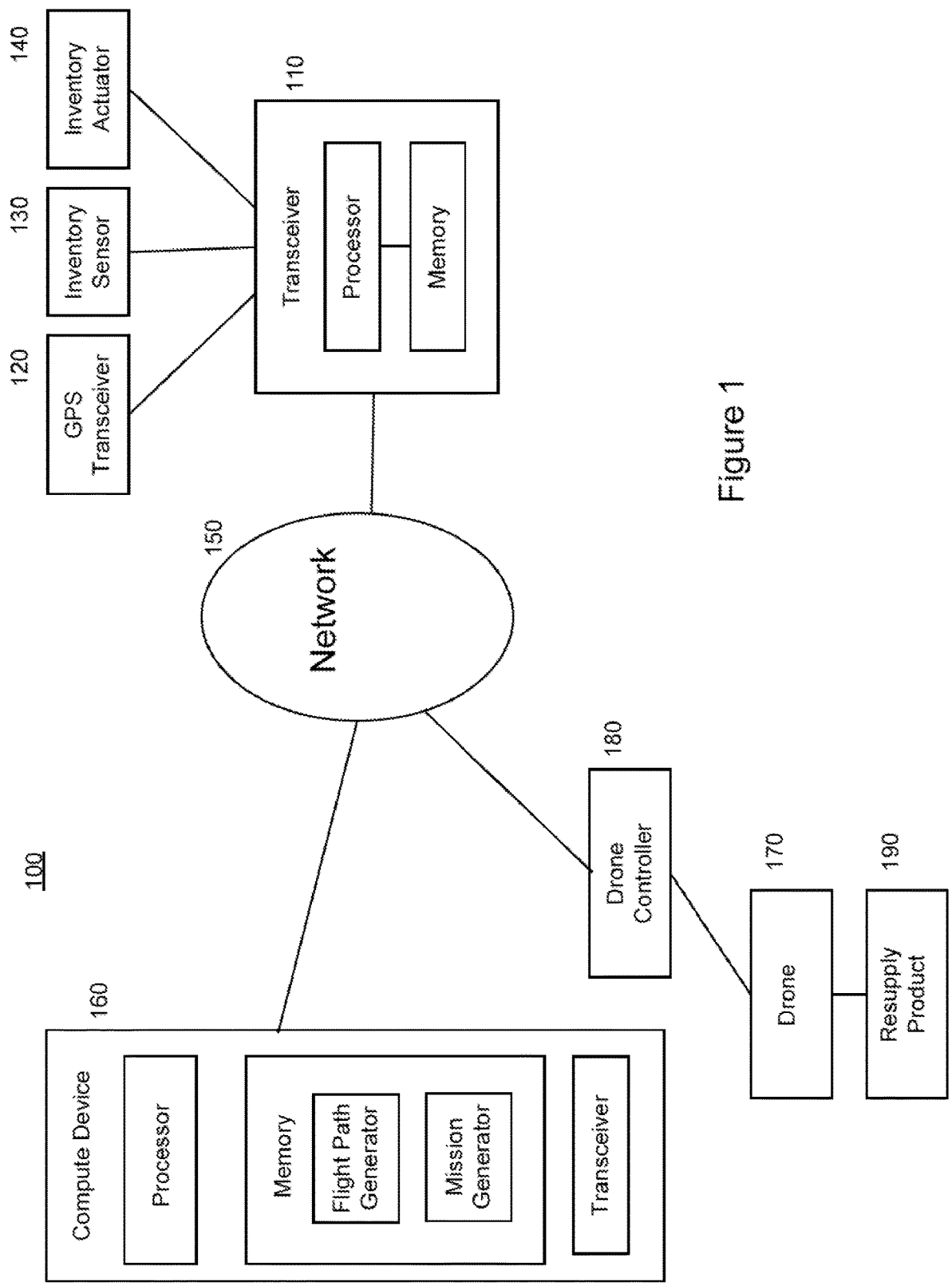
FIG. 1 shows a system block diagram of a drone resupply system, according to an embodiment.

FIG. 1 shows a system block diagram of a drone resupply system 100, according to an embodiment. The drone resupply system 100 includes transceiver 110, which is operatively coupled to a global positioning system (GPS) transceiver 120 and one or both of inventory sensor 130 and inventory actuator 140. Each of transceiver 110, GPS transceiver 120, inventory sensor 130 and/or inventory actuator 140 can be physically located on a person. Transceiver 110 is operatively coupled to network 150, which in turn is operatively coupled to compute device 160 and drone controller 180. Drone controller 180 is also operatively coupled to drone 170, which is configured to deliver a resupply product 190.

Transceiver 110 can receive a signal from each of GPS transceiver 120 and one or both of inventory sensor 130 and inventory actuator 140. The signal from GPS transceiver 120 can indicate the geolocation of the person wearing (or in possession of) the GPS transceiver 120 and optionally an indication of the accuracy of the geolocation. More specifically, the GPS transceiver 120 can receive satellite signals and derive a location identification based on the received satellite signals. The GPS transceiver 120 can provide the location identification to the transceiver 110. The GPS transceiver 120 can be configured to provide the location identification to the transceiver 110 continuously, repeatedly and/or upon request.

The signal from inventory sensor 130 can indicate a product that has been used or removed, and for which resupply is requested automatically without human intervention. For example, a medic kit can include a sensor that detects when a medical device or material has been removed from the medic kit. Upon such detection, the inventory sensor 130 can send to the transceiver 110 a signal that indicates that the item(s) have been removed and the quantity of each item(s) removed. For another example, a soldier can have a rifle with smart ammunition that tracks the usage of bullets, the inventor sensor 130 can send to the transceiver 110 a signal that indicates that the number of bullets expended. The signal from inventory sensor 130 is sent to transceiver 110 without human intervention in the sense that the individual associated with the resupply request need not initiate the resupply request, need not identify the product to be resupplied, and need not identify the quantity of the product to be resupplied. Rather, because the inventory sensor 130 can automatically detect a product (and the quantity) that has been used or removed, the inventory sensor 130 can send a signal to transceiver 110 without any human intervention.

The signal from inventory actuator 140 can indicate that the individual has requested resupply of a product. For example, the inventory actuator 140 can be a wearable box or panel with at least one button that can be depressed by an individual. In the example of a soldier with an inventory actuator 140, the soldier can select one button (e.g., a top button or blue colored button) for one type of product for resupply at a predefined quantity (e.g., ten rounds of ammunition) and a different button (e.g., a bottom button or green colored button) for another type of product for resupply at a predefined quantity (e.g., one first-aid kit). Upon actuation of inventory actuator 140, a transmitter (not shown in FIG. 1) of inventory actuator 140 can send to transceiver 110 a signal that indicates which actuator was selected and optionally can include the item and/or quantity to be supplied. Alternatively, the signal can indicate which actuator was selected without including any product or quantity information; such information can be identified at the transceiver 110 based on the indication of which actuator was selected, for example, based on a look-up table stored at the memory of the transceiver. The signal from inventory actuator 140 is sent to transceiver 110 without human intervention beyond the individual actuating the inventory actuator 140. In other words, once the individual has actuated the inventory actuator 140, that individual need not identify the product to be resupplied and need not identify the quantity of the product to be resupplied.

After receiving the product and/or quantity information at transceiver 110 from inventory sensor 130 and/or inventory actuator 140, transceiver 110 can define a signal representing or identifying the product and/or quantity information for the resupply product(s). Transceiver 110 can then send the signal to compute device 160 via network 150 such that the compute device sends flight plan information and a drone selection to a drone(s) to initial drone deliver of the resupply product to the individual, as described further herein.

Network 150 can be, for example, a wireless network(s) or a combination of a wireless network(s) and wired networks. More specifically, the connection between transceiver 110 and the network 150 is likely a connection over a wireless network(s) given the possible remote location of the individual with transceiver 110; the connection between the compute device 160 and network 150 can be a wireless connection(s) and/or wired connection(s). A wireless network(s) of network 150 can include or enable, for example, a satellite connection(s) by which transceiver 110 to connect to a satellite (not shown) and for the satellite to connect to a remaining portion of network 150 or to the compute device 160.

Compute device 160 can be, for example, any type of computer, server, etc. that has a processor that executes instructions such as software instructions stored in a memory of compute device 160. The compute device 160 includes a processor, a memory operatively coupled to the processor, and a transceiver operatively coupled to the processor and the memory. The memory can include a flight path generator and a mission generator. The flight path generator can calculate a flight path for a drone 180 that is dispatched to perform product resupply as described further herein. The mission generator can determine or identify mission information such as the product(s) to be resupplied and the drone(s) to deliver the resupply product(s), based on the signal received from transceiver 110 (via network 150) and representing or identifying the product and/or quantity information for the resupply product(s). The selection of the drone(s) to deliver the resupply product(s) can be based on the location or proximity of the drone(s) relative to the resupply product(s). For example, if the resupply product(s) is available only at certain locations, then the drone(s) can be selected based on the proximity to the resupply product(s) and whether a mechanism is available for loading the resupply product(s) on the drone(s) (e.g., whether automatic loading, manual loading and/or pre-loading of resupply product(s) is available). The memory of compute device 160 can store the information related to the resupply product and drone availability, and such information can be updated as resupply product(s) and drone(s) are used or deployed.

Drone controller 180 is operatively coupled to the compute device 160 via network 150, and also operatively coupled to drone 170 for at least an initial portion of the flight of the drone 170. In some implementations, drone controller 180 can communicate with and control a single drone 170. In other implementations, drone controller 180 can communicate with and control multiple drones 170. When drone controller 180 communicates with and controls a single drone 170, the compute device 160 can communicate with drone controller 180 (and not other drone controllers 180) based on the drone selection information of the mission information determined by the mission generator. When drone controller 180 communicates with and controls multiple drones 170, the compute device 160 can communicate with drone controller 180 such that drone controller 180 can select from among the associated drones 170 which drone(s) 170 to deploy for a given mission based on the mission information provided by the mission generator.

The drone controller 180 can receive the flight path information from compute device 160 (after being generated by the flight path generator of compute device 160). The drone controller 180 can relay the light path information to drone 170 so that the drone 170 can fly to the individual at the geolocation location coordinates provided by GPS transceiver 120. In situations where the individual will remain stationary after the request of product resupply, the connection between drone controller 180 and drone 170 is present at the pre-flight stage of the operation of drone 170, and optionally not after the drone 170 has started its flight. In situations where the individual will not remain stationary after the request of product resupply, the connection between drone controller 180 and drone 170 is present during at least the entirety of the flight of the drone 170 to the individual. This allows for the transceiver 110 to provide updates to the individual's location as represented by updates in the GPS location information provided by GPS transceiver 120 to transceiver 110 and compute device 160, which in turn allows for updates to the flight path information (as updated by flight path generator) to be relayed from compute device 160 to drone controller 180 and in turn to drone 170.

Drone 170 can any type of appropriate unmanned autonomous vehicle (UAV) and can operate with any type of appropriate autonomous control. For example, drone 170 can operate autonomously based on an onboard processor (not shown in FIG. 1) or piloted by an autonomous robot (such as an autonomous robot optionally included in drone controller 180). Drone 170 is sized and configured to carry the possible resupply products and travel to the individual with the selected resupply product(s) and return without the resupply product(s). Thus, the heavier the resupply product and the greater the distance between the initial position of the drone 170 and the individual, then the larger the drone 170 will be.

Drone 170 can carry a resupply product 190 that is delivered from an initial location remote from the individual to a location at or near the individual. For example, the drone 170 can be loaded with the resupply product 190 in response to compute device 160 receiving the resupply request from transceiver 110. Such loading can be done automatically (e.g., by autonomous flight instructions to pick up the resupply product 190 pre-flight) or manually. Alternatively, the drone 170 can be pre-loaded with a particular resupply product 190 so that, upon receiving a resupply request for that particular resupply product, that drone 170 is deployed with the pre-loaded resupply product.

The resupply product 190 can be any type of product that can be attached to and carried by drone 170 and that is responsive to the request by the individual (e.g., responsive to the signal representing or identifying the product and/or quantity information for the resupply product(s)). For example, the resupply product 190 can a medical device or material from medic kit. Alternatively, the resupply product 190 can be a medical test kit such as a coronavirus (COVID-19) test kit. For another example, the resupply product 190 can be smart ammunition for a rifle.

Once the drone 170 reaches a predefined distance of the individual, the drone 170 can automatically release the resupply product(s) 190. For example, the flight plan of the drone 170 can be such that the drone 170 will not land but instead will hover above or near the individual and then release the resupply product(s) 190. For example, the flight plan can be defined such that when drone 170 is within a predefined horizontal distance from the individual (e.g., nine feet) and a predefined vertical distance from the individual (e.g., eight feet), the drone 170 can release the resupply product(s) 190 and then travel to a defined location (e.g., the starting location of the drone 170 during the mission or a different location defined by the flight plan according to the mission). In some implementations, the vertical distance from the individual at which the drone 170 releases resupply product(s) 190 can vary depending on the weight and/or type of the resupply product(s) 190, and can be determined/defined before during the flight of the drone 170. For example, the vertical distance from the individual at which the drone 170 releases resupply product(s) 190 can be defined when the drone 170 is loaded with the resupply product(s) 190 pre-flight, and can be defined after the drone 170 has been loaded with the resupply product(s) and during flight. In some implementations, the drone 170 can delay automatically releasing the resupply product(s) 190 until an accuracy of the GPS location of the individual is within a predefined threshold. For example, if the accuracy of the GPS location is only 25 meters but the predefined threshold 10 meters, then the drone 170 can maintain its location until the GPS accuracy improves to 10 meters or less, and then adjust its position toward the individual based on the updated GPS location and then release the resupply product(s) 190.

In some implementations, the drone 170 does not automatically release the resupply product(s) 190 upon reaching a predefined distance of the individual, but instead the individual can activate an actuator (e.g., the inventory actuator 140 or a separate actuator not shown in FIG. 1) to trigger the drone 170 to release the resupply product(s) 190. In such implementations, the drone 170 can follow the individual based on the GPS signal from the GPS transceiver 120 until the individual activates the inventory actuator 140.

In some implementations, the resupply product(s) 190 can be dropped at a location offset from the individual. For example, an offset distance can be predefined and the drone 170 can release the resupply product(s) 190 when the drone 170 is located from the individual at a distance corresponding to the offset. In some other implementations, the individual can provide information on the offset; for example, the individual can activate one actuator (e.g., the inventory actuator 140 or a separate actuator not shown in FIG. 1) to indicate a small offset (e.g., predefined as 50 yards) and another actuator to indicate a large offset (e.g., predefined as 100 yards). In some implementations, the individual can activate an actuator (e.g., the inventory actuator 140 or a separate actuator not shown in FIG. 1) to indicate a direction relative to the individual and in combination with the offset as to where the resupply product(s) 190 are to be released by the drone 170. For example, the actuator can have a north, east, south and west indication to allow the individual to indicate a direction to be combined with the offset as to where the resupply product(s) 190 are to be released by the drone 170.

In some implementations, the individual can confirm successful release by the drone 170 and/or receipt by the individual of the resupply product(s). For example, the individual can activate an actuator (e.g., the inventory actuator 140 or a separate actuator not shown in FIG. 1) to indicate successful release (or not) by the drone 170 and/or receipt (or not) by the individual of the resupply product(s), and this indication can be sent from transceiver 110 to compute device 160 via network 150.

Although FIG. 1 is discussed in the context of a single drone 170 performing a single mission to deliver resupply product to a single individual, it should be understood that a given drone 170 can deliver resupply product to multiple individuals within a single mission (e.g., delivering half the resupply product to one individual and then the other half of the resupply product to a second individual). Similarly, a drone 170 can perform multiple missions to deliver multiple types of resupply products and/or to multiple individuals. For example, a drone 170 can be instructed to deliver resupply product to an individual, return to the starting location to add more resupply product, and then deliver the resupply product to the same individual (or a different individual). For example, a drone 170 can be instructed to deliver resupply product to an individual, travel to a different resupply location to obtain more (or different) resupply product, deliver the resupply product to an individual (the same or different individual), etc. Finally, multiple drone 170 can be instructed to perform a coordinated single mission, for example, flying in a swam configuration for a common destination location or proximate multiple destination locations.

In some implementation, the drone 170 can be included within a swarm of drones 170 destined for the same general geographic area, e.g., where several individuals in the geographic area request resupply product(s) within a similar time period. In such situations, a swarm of drones 170 can be deployed within a similar time period and in a coordinated manner to collisions among the drones 170. De-confliction a swarm of drones 170 can be performed, for example, by flying different drones 170 at different altitudes until the swarm of drones 170 arrive near or within a perimeter of the individuals requesting the drone 170. Once at such a perimeter, a device-to-device de-confliction can be performed, for example, slot scheduling so that different drones 170 fly towards the individuals in different time slots and/or different geographic corridors. In some implementations, the drones 170 can include transponders to assist in the drones 170 avoiding colliding with each other.

Figure 2:
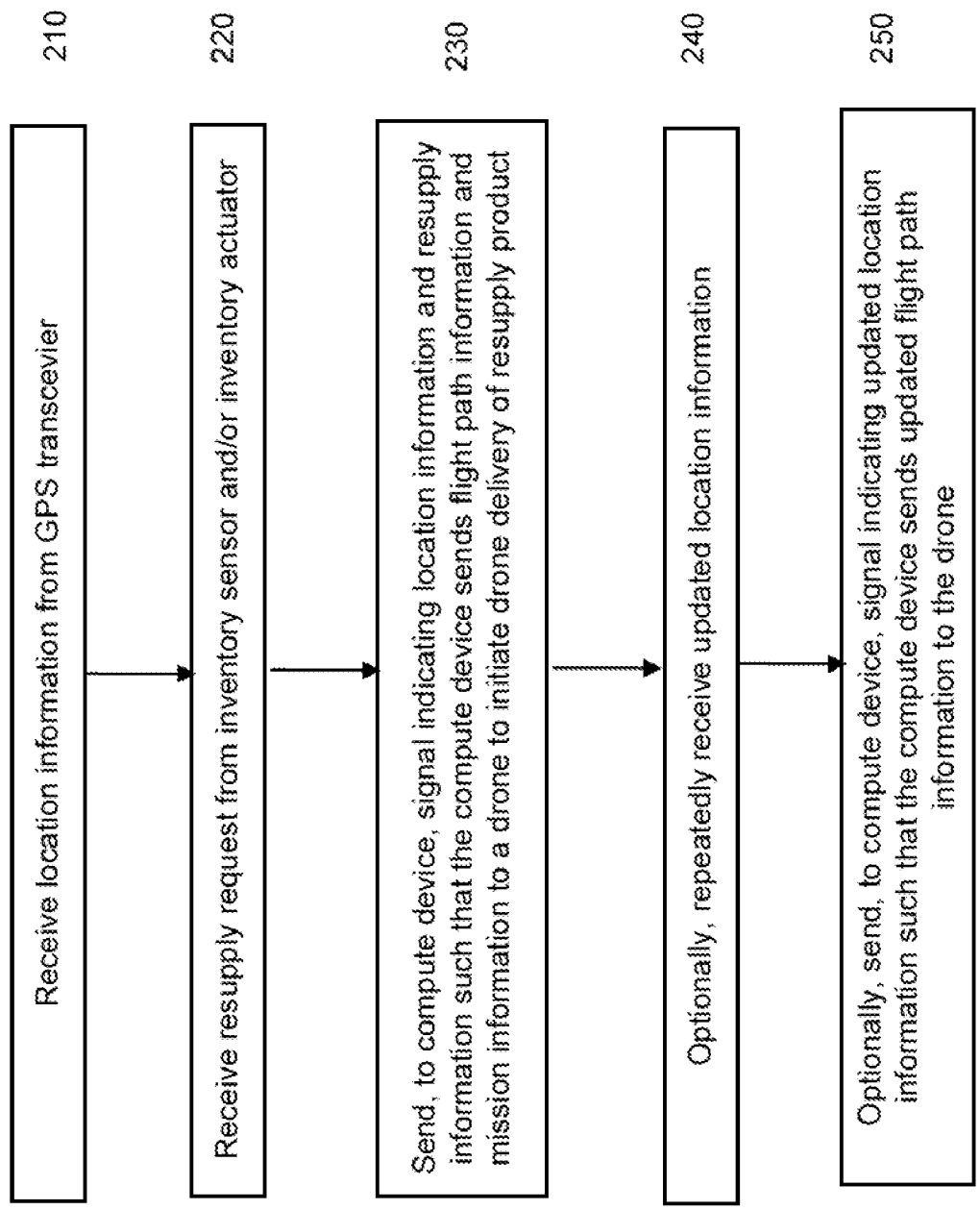
FIG. 2 shows a flowchart of a method of receiving location and resupply product/quantity information and sending a representation of the location and resupply product/quantity information to a compute device, according to an embodiment.

FIG. 2 shows a flowchart of a method of receiving location and resupply product/quantity information and sending it to a compute device, according to an embodiment. At 210, location information from a GPS transceiver can be received (e.g., received at a transceiver such as transceiver 110 in FIG. 1). The location information from the GPS transceiver can be received and/or sent without human intervention. In other words, the generation, identification, receiving and/or sending of the location information may not be in response to a human action (such as a request or user input), but rather autonomously (e.g., according to a pre-defined schedule, in response to an automatic detection of a condition, or in response to an autonomously generated request). Said another way, the GPS transceiver can determine and transmit the location information autonomously without a human initiating such activities. At 220, the resupply request from an inventory sensor (e.g., inventory sensor 130) and/or the resupply request from an inventory actuator (e.g., inventory actuator 140) can be received (e.g., received at transceiver 110). In some embodiments, the resupply request is generated, transmitted and/or received without human intervention. In other words, the generation, transmission, and/or receiving of the resupply request may not be in response to a human action (such as a manual request or user input), but rather may be autonomous and in response to an inventory sensor (e.g., inventory sensor 130) detecting that a product should be resupplied (e.g., due to an on-hand quantity being below a predefined threshold and/or a projected near-term demand exceeding the on-hand quantity). In other embodiments, the resupply request can be generated, transmitted and/or received in response to a human intervention, such as an actuation, by a user, of an inventory actuator (e.g., inventory actuator 140) and/or a user input received via a graphical user interface (GUI) of a resupply system. At 230, a signal indicating location information and resupply information is sent from the transceiver to a compute device (e.g., compute device 160 in FIG. 1) such that the compute device sends flight path information and mission information (e.g., product identification, product quantity and drone selection) to a drone (e.g., drone 170 of FIG. 1) to initiate drone delivery of the resupply product (e.g., resupply product 190 of FIG. 1).

In situations where the individual will remain stationary after the request of product resupply, the connection to the drone is present at the pre-flight stage of the operation of drone, and optionally not after the drone has started its flight. In situations where the individual will not remain stationary after the request of product resupply, the connection to the drone is present during at least the entirety of the flight of the drone to the individual. In these situations, at optional 240, the transceiver receives updated location information from the GPS transceiver, for example, continuously, repeatedly or triggered by the individual (e.g., each time the individual moves a non-trivial distance). At optional 250, the transceiver sends, to the compute device, a signal indicating updated location information such that the compute device sends updated flight path information to the drone.

Figure 3:
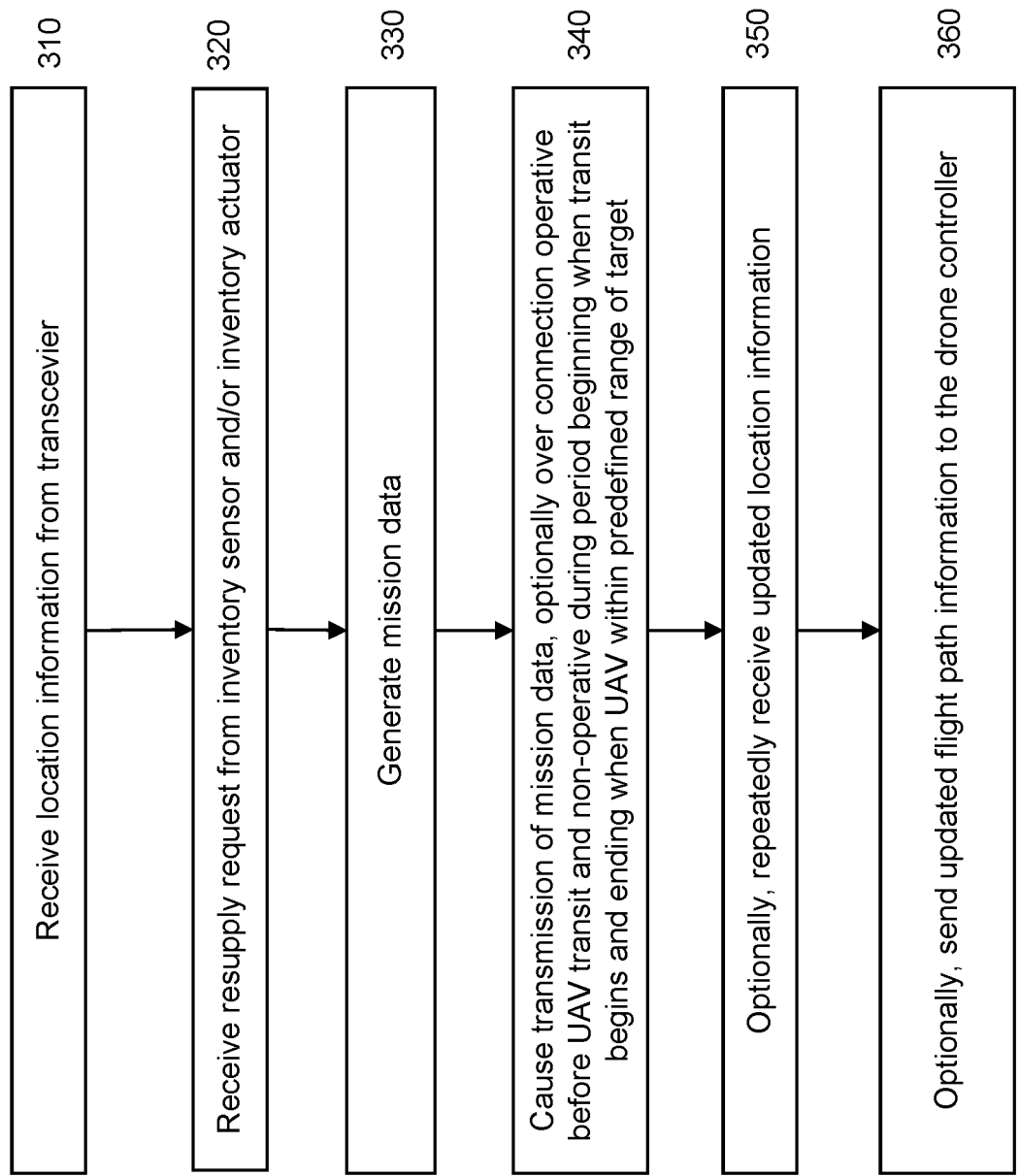
FIG. 3 shows a flowchart of a method of receiving location and resupply product/quantity information, generating mission data, and sending a representation of the mission data to a drone controller to initiate navigation of a drone, according to an embodiment.

FIG. 3 shows a flowchart of a method of receiving location and resupply product/quantity information, generating mission data, and sending the mission data to a drone, according to an embodiment. At 310, location information from a transceiver (e.g. transceiver 110) can be received (e.g., received at a compute device such as compute device 160 in FIG. 1). The location information can be received without human intervention. In other words, the process of obtaining the location information (e.g. via a GPS transceiver 120) and delivering it to the compute device (e.g. via transceiver 110) can be done autonomously without human involvement. At 320, the resupply request from an inventory sensor (e.g., inventory sensor 130) and/or the resupply request from an inventory actuator (e.g., inventory actuator 140) can be received (e.g., received at compute device 160). In one embodiment, the resupply request can be received without human intervention. In other words, the resupply request can be received not in response to human action (i.e., manually requesting a resupply), but rather in response to an inventory sensor (e.g., inventory sensor 130) detecting that a product should be resupplied, and autonomously generating a resupply request. Alternatively, in another embodiment, the resupply request can be received in response to (or as a consequence of) a human intervention, for example when a user actuates an inventory actuator (e.g., inventory actuator 140) to initiate the resupply request. At 330, mission data can be generated by the compute device based on the location information and product/quantity information of the resupply request. The mission data can include a representation of a drone that will be used to transport one or more products specified by the resupply request, and flight path data for that drone. The flight path data can be determined based on any or a combination of a variety of factors, such as delivery distance, delivery time, weather, obstacles (e.g., buildings, trees), known areas to avoid (e.g., densely populated areas), and/or the like, such that the resupply product (e.g. resupply product 190) is delivered safely and efficiently. At 340, the compute device (e.g., compute device 160) causes transmission of the mission data to a drone controller (e.g., drone controller 180) to cause the drone controller to initiate navigation of the drone (e.g., drone 170) according to/based on the mission data.

In situations where an individual associated with the resupply request will remain stationary for at least a predefined period of time after the request of product resupply, a connection between the drone and the drone controller may be present at the pre-flight stage of the operation of drone, and optionally not after the drone has started its flight. In situations where the individual will not remain stationary after the request of product resupply, the connection between the drone and the drone controller may be present during at least the entirety of the flight of the drone to the individual (or at least until the individual remains stationary). In these situations, at optional 350, updated location information is received (e.g., received at compute device 160) from the transceiver (e.g., transceiver 110), for example, continuously, repeatedly or triggered by the individual (e.g., each time the individual moves a non-trivial distance). At optional 360, updated flight path information is sent (e.g., sent from compute device 160) to the drone controller based on the updated location information to cause the drone to navigate to the new location of the individual.

It should be understood that the discussion herein as well as alternative embodiments can be based on and/or including the use of drones of various types includes, for example, air-based drones (e.g., unmanned aerial vehicles), land-based drones (e.g., unmanned ground vehicles) or water-based drones (e.g., unmanned marine vehicles and unmanned underwater vehicles). Thus, it should be understood that references to dropping or releasing resupply product(s) have an analogous context for unmanned ground vehicles that drop or release product from approximately ground level, for unmanned marine vehicles that drop or release product from approximately the level of the water surface, and for unmanned underwater vehicles that release product from a level below the water surface to float to the water surface, sink to a level further below the water surface or maintain substantially the same level from the water surface as the unmanned underwater vehicle (e.g., where the resupply product(s) has a neutral buoyancy).

Although various devices described herein are shown as separate devices, it should be understood that different devices can be combined into a single device, e.g., transceiver 110, GPS transceiver 120 and inventory sensor 130 and/or inventory actuator 140 can be combined into a single device.

Although one or more embodiments are described with respect to resupplying products that were already available to the individual, it should be understood that other embodiments are possible where such products are not initially available to the individual. For example, an individual without a particular product can request being supplied with the product according to the apparatus and methods described herein. For another example, the product can be a medical test kit such as a coronavirus (COVID-19) test kit.

Although one or more embodiments are described with respect to delivery of a resupply product(s) (or non-resupply product(s)) based on the GPS-defined geolocation, it should be understand that the location of the individual can be based on information other than GPS-defined geolocation. For example, when the product is a medical test kit such as a coronavirus (COVID-19) test kit, the product can be delivered to a particular location based on an address such as a home address of the individual coronavirus (COVID-19) test kit).

In some embodiments, a method includes receiving, at a processor, from a transceiver and without human intervention, location data associated with a target; receiving, at the processor and from the transceiver, product data for a resupply request referencing the target, the product data including at least one of a product type or a product quantity; generating, via the processor and without human intervention, unmanned autonomous vehicle (UAV) mission data based on the location data and the product data, the UAV mission data including a representation of at least one UAV and flight path data for the at least one UAV; and causing transmission of the UAV mission data to at least one UAV controller to cause the at least one UAV controller to initiate navigation of the at least one UAV according to the UAV mission data.

In some implementations, the product data is received without human intervention.

In some implementations, the product data is identified and transmitted without human intervention, in response to determining that the product quantity is below a predefined minimum quantity.

In some implementations, the product data is identified and transmitted in response to detecting a human intervention with a trigger.

In some implementations, the at least one UAV is a drone.

In some implementations, the target includes at least one of a soldier or a medic.

In some implementations, a network connection is maintained between the UAV controller and the at least one UAV during at least a time period beginning when the UAV begins a transit and ending when the UAV is within a predefined range of the target.

In some implementations, the UAV controller transmits updated UAV mission data to the UAV during the time period in response to detecting a change to at least one of a location of the target, the product type, or the product quantity.

In some implementations, there is not a network connection between the UAV controller and the at least one UAV during a period beginning when the UAV begins transit and ending when the UAV is within a predefined range of the target.

In some implementations, the at least one UAV releases a product, corresponding with the product type, only after the UAV is within a predefined range of the target and has received a release signal.

In some embodiments, a method includes receiving, at a processor, from a global positioning system (GPS) transceiver and without human intervention, location data associated with a target; receiving, at the processor and from one of an inventory sensor or an inventory actuator, product data for a resupply request referencing the target, the product data including at least one of a product type or a product quantity; and in response to receiving the location data and the product data, transmitting a signal, via the processor, to a remote compute device, the signal including a representation of the location data and a representation of the product data, to cause the remote compute device to direct an unmanned autonomous vehicle (UAV) to navigate to within a predefined range of the target.

In some implementations, the product data is received without human intervention via the inventory sensor and not the inventory actuator.

In some implementations, the product data is identified and transmitted to the processor without human intervention, in response to determining that the product quantity is below a predefined minimum quantity.

In some implementations, the product data is identified and transmitted in response to detecting a human intervention with the inventory actuator.

In some implementations, the UAV is a drone.

In some implementations, the target includes at least one of a soldier or a medic.

In some embodiments, a non-transitory computer readable storage medium stores data representing software executable by a computer, the software including instructions to: receive, without human intervention, location data associated with a target; receive product data for a resupply request referencing the target, the product data including at least one of a product type or a product quantity; generate a first portion of UAV mission data based at least in part on the location data and the product data, the first portion of UAV mission data including a representation of at least one UAV to be used for the resupply request; generate a second portion of UAV mission data based on at least two of the location data, the product data, or a location of the at least one UAV, the second portion of UAV mission data including a representation of a flight path data for the at least one UAV; and cause transmission of the first portion of UAV mission data and the second portion of UAV mission data to at least one UAV controller to cause the at least one UAV controller to navigate the at least one UAV according to the second portion of UAV mission data.

In some implementations, the product data is received without human intervention.

In some implementations, the product data is identified by an inventory sensor, without human intervention, in response to determining that the product quantity has a value that is below a predefined minimum quantity.

In some implementations, the product data is identified and transmitted in response to detecting a human intervention with an inventory actuator.

In some implementations, the at least one UAV is a drone.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
receiving, at a processor and from a transceiver that is located with a target to benefit from a resupply request, location data of the transceiver and sent from the transceiver without human intervention;
receiving, at the processor and from an inventory sensor via the transceiver, product data for the resupply request referencing the target, the product data including at least one of a product type or a product quantity, the product data being received without human intervention;
generating, via the processor and without human intervention, unmanned autonomous vehicle (UAV) mission data based on the location data and the product data, the UAV mission data including a representation of at least one UAV and flight path data for the at least one UAV, the flight path data including data associated with a location for release of a resupply product based at least in part on an indication that release should be offset from the target by a predefined distance; and
causing transmission of the UAV mission data to at least one UAV controller to cause the at least one UAV controller to initiate navigation of the at least one UAV according to the UAV mission data.

2. The method of claim 1, wherein the product data is identified and transmitted via the inventory sensor and without human intervention, in response to determining that the product quantity is below a predefined minimum quantity.

3. The method of claim 1, wherein the at least one UAV is a drone.

4. The method of claim 1, wherein the target includes at least one of a soldier or a medic.

5. The method of claim 1, wherein a network connection is maintained between the UAV controller and the at least one UAV during at least a time period beginning when the at least one UAV begins a transit and ending when the at least one UAV is within a predefined range of the target.

6. The method of claim 5, wherein the UAV controller transmits updated UAV mission data to the at least one UAV during the time period in response to detecting a change to at least one of a location of the target, the product type, or the product quantity.

7. The method of claim 1, wherein the causing transmission includes causing transmission over a network connection that is between the UAV controller and the at least one UAV and operative before the at least one UAV begins transition and that is not operative during a period beginning when the at least one UAV begins transit and ending when the at least one UAV is within a predefined range of the target.

8. The method of claim 1, wherein the at least one UAV releases a product, corresponding with the product type, only after the at least one UAV is within a predefined range of the target and has received a release signal.

9. The method of claim 1, wherein the location for release is based at least in part on an indication of a direction relative to the target.

10. The method of claim 1, wherein the indication includes an indication of a selection of a predefined offset distance from a plurality of predefined offset distances.

11. The method of claim 1, wherein the indication is in response to activation of an actuator operably coupled to the transceiver, the indication includes an indication of at least one of a direction for the offset relative to the target or a selection of a predefined offset distance from a plurality of predefined offset distances.

12. A method, comprising:
receiving, at a processor and from a global positioning system (GPS) transceiver that is located with a target to benefit from a resupply request, location data of the GPS transceiver and sent from the GPS transceiver without human intervention;
receiving, at the processor and from an inventory sensor, product data for the resupply request referencing the target and sent without human intervention, the product data including at least one of a product type or a product quantity; and
in response to receiving the location data and the product data, transmitting a signal, via the processor, to a remote compute device, the signal including a representation of the location data and a representation of the product data, to cause the remote compute device to direct an unmanned autonomous vehicle (UAV) to navigate to a location for release of a resupply product based at least in part on an indication that release should be offset from the target by a predefined distance.

13. The method of claim 12, wherein the product data is identified and transmitted to the processor without human intervention, in response to determining that the product quantity is below a predefined minimum quantity.

14. The method of claim 12, wherein the UAV is a drone.

15. The method of claim 12, wherein the target includes at least one of a soldier or a medic.

16. The method of claim 12, wherein the indication includes an indication a direction for the offset relative to the target.

17. A non-transitory computer readable storage medium storing data representing software executable by a computer, the software including instructions to:
  receive, from a transceiver located with a target to benefit from a resupply request, location data of the transceiver and sent from the transceiver without human intervention;
  receive product data for the resupply request referencing the target, the product data including at least one of a product type or a product quantity, the product data being received without human intervention and identified by an inventory sensor, without human intervention, in response to determining that the product quantity has a value that is below a predefined minimum quantity;
  generate a first portion of UAV mission data based at least in part on the location data and the product data, the first portion of UAV mission data including a representation of at least one UAV to be used for the resupply request;
  generate a second portion of UAV mission data based on at least two of the location data, the product data, or a location of the at least one UAV, the second portion of UAV mission data including a representation of a flight path data for the at least one UAV, the flight path data including data associated with a location for release of a resupply product based at least in part on an indication that release should be offset from the target by a predefined distance; and
  cause transmission of the first portion of UAV mission data and the second portion of UAV mission data to at least one UAV controller to cause the at least one UAV controller to navigate the at least one UAV according to the second portion of UAV mission data.

18. The non-transitory computer readable storage medium of claim 17, wherein the at least one UAV is a drone.

19. The non-transitory computer readable storage medium of claim 17, wherein the indication includes an indication of a direction for the offset relative to the target.

* * * * *